US008253819B2

United States Patent
Ishii et al.

(10) Patent No.: US 8,253,819 B2
(45) Date of Patent: Aug. 28, 2012

(54) ELECTRONIC CAMERA AND IMAGE PROCESSING METHOD

(75) Inventors: Yasunori Ishii, Osaka (JP); Yusuke Monobe, Kyoto (JP); Yasunobu Ogura, Osaka (JP); Kazuyuki Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 12/865,917

(22) PCT Filed: Feb. 6, 2009

(86) PCT No.: PCT/JP2009/000477
§ 371 (c)(1),
(2), (4) Date: Aug. 3, 2010

(87) PCT Pub. No.: WO2009/098894
PCT Pub. Date: Aug. 13, 2009

(65) Prior Publication Data
US 2011/0001840 A1 Jan. 6, 2011

(30) Foreign Application Priority Data

Feb. 6, 2008 (JP) ................................ 2008-026160

(51) Int. Cl.
*H04N 5/228* (2006.01)
*H04N 5/225* (2006.01)
*H04N 5/222* (2006.01)
*H04N 5/232* (2006.01)
*G06K 9/00* (2006.01)
*G06K 9/46* (2006.01)
*G06K 9/62* (2006.01)

(52) U.S. Cl. ............... 348/222.1; 348/169; 348/208.14; 348/333.01; 348/333.05; 348/333.11; 348/345; 348/349; 382/103; 382/118; 382/168; 382/172; 382/190; 382/203; 382/209

(58) Field of Classification Search .......... 348/169–172, 348/207.99, 208.99, 208.12, 208.14–208.16, 348/222.1, 333.01–333.05, 333.11–333.12, 348/345, 349–356; 382/103, 115–118, 168–172, 382/190, 195, 199, 203, 209
See application file for complete search history.

(56) References Cited

U.S. PATENT DOCUMENTS 7,315,631 B1 * 1/2008 Corcoran et al. ............. 382/118
(Continued)

FOREIGN PATENT DOCUMENTS

JP 10-304348 11/1998
(Continued)

OTHER PUBLICATIONS

International Search Report issued Apr. 28, 2009 in International (PCT) Application No. PCT/JP2009/000477.
Naruatu Baba et al., "*HeadFinder: A Multi Person Tracking System Using Motion Video of a Single Camera*", The 7th Symposium on Sensing via Image Information (SSII2001), Jun. 2001, pp. 363-368.

*Primary Examiner* — Jason Chan
*Assistant Examiner* — Michael Osinski
(74) *Attorney, Agent, or Firm* — Wenderoth, Lind & Ponack, L.L.P.

(57) ABSTRACT

A tracking processing unit (137) performs a search in a frame using a color feature amount of an object and determines a target area estimated to include the image of the object based on the first evaluation value indicating a degree of matching between a search result and the object. An update detection circuit (139) performs a search in the frame using a shape feature amount of the object, calculates a second evaluation value, and determines an update area for updating a first feature amount based on the second evaluation value indicating a degree of matching between the search result and the object. An update determination circuit (140) determines whether or not to update the first feature amount. A tracking result drawing circuit (144) draws an outer frame of the target area when determined not to update, and draws that of the update area when determined to update.

19 Claims, 11 Drawing Sheets

U.S. PATENT DOCUMENTS

| | | | |
|---|---|---|---|
| 8,103,062 B2 * | 1/2012 | Abe et al. | 382/118 |
| 2002/0081026 A1 * | 6/2002 | Izume et al. | 382/170 |
| 2002/0102024 A1 | 8/2002 | Jones et al. | |
| 2003/0071908 A1 * | 4/2003 | Sannoh et al. | 348/345 |
| 2006/0177110 A1 * | 8/2006 | Imagawa et al. | 382/118 |
| 2007/0172126 A1 * | 7/2007 | Kitamura | 382/190 |
| 2009/0059007 A1 * | 3/2009 | Wagg et al. | 348/157 |
| 2009/0169067 A1 * | 7/2009 | Chang et al. | 382/118 |
| 2010/0150401 A1 * | 6/2010 | Kizuki et al. | 382/103 |
| 2011/0026767 A1 * | 2/2011 | Miyazaki | 382/103 |
| 2011/0096995 A1 * | 4/2011 | Ito | 382/190 |

FOREIGN PATENT DOCUMENTS

| | | |
|---|---|---|
| JP | 11-167455 | 6/1999 |
| JP | 2002-157599 | 5/2002 |
| JP | 2004-362210 | 12/2004 |

* cited by examiner

FIG. 3
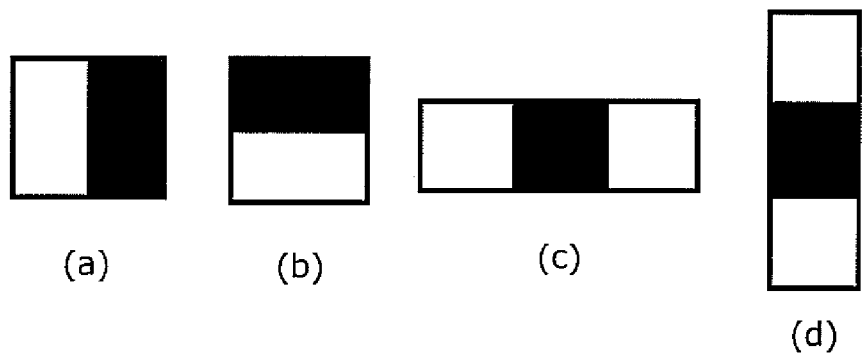
(a)  (b)  (c)  (d)
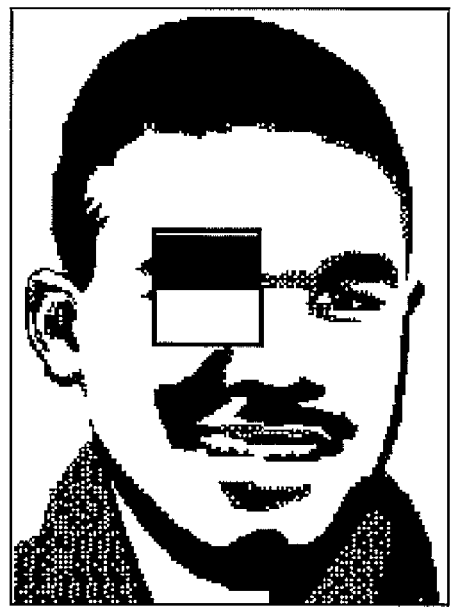
(e)

FIG. 5
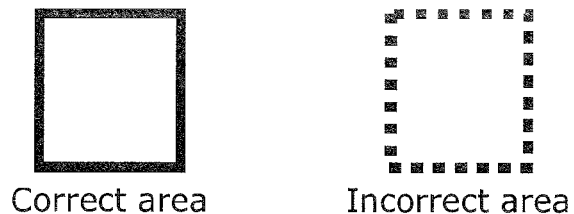
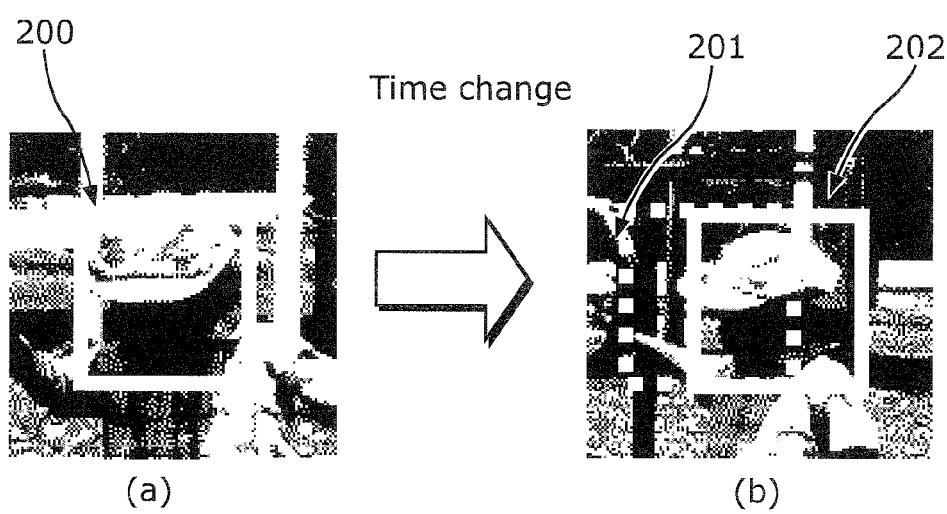
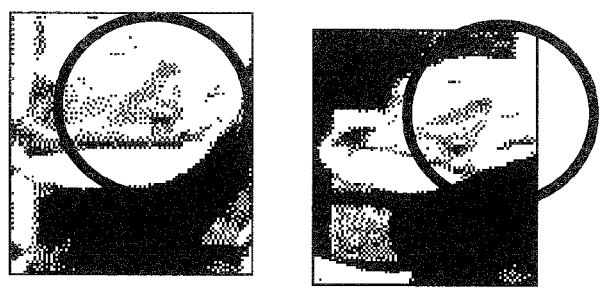
Feature similar, but incorrect
Feature not similar, but correct FIG. 6
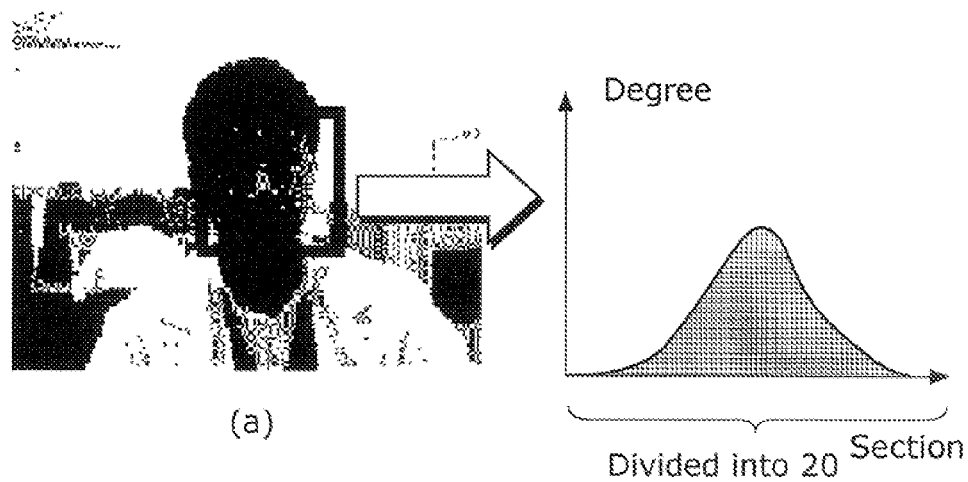
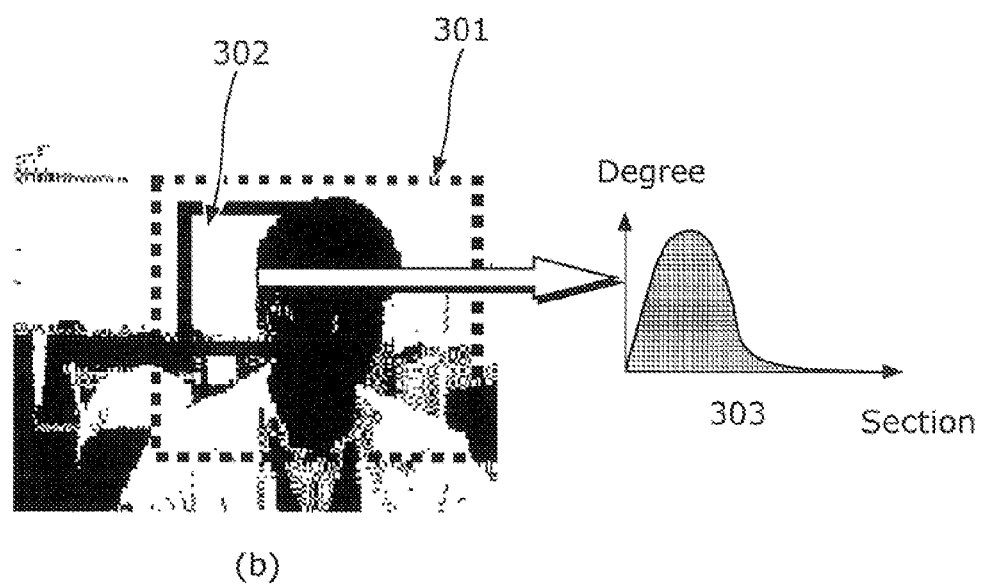

FIG. 8
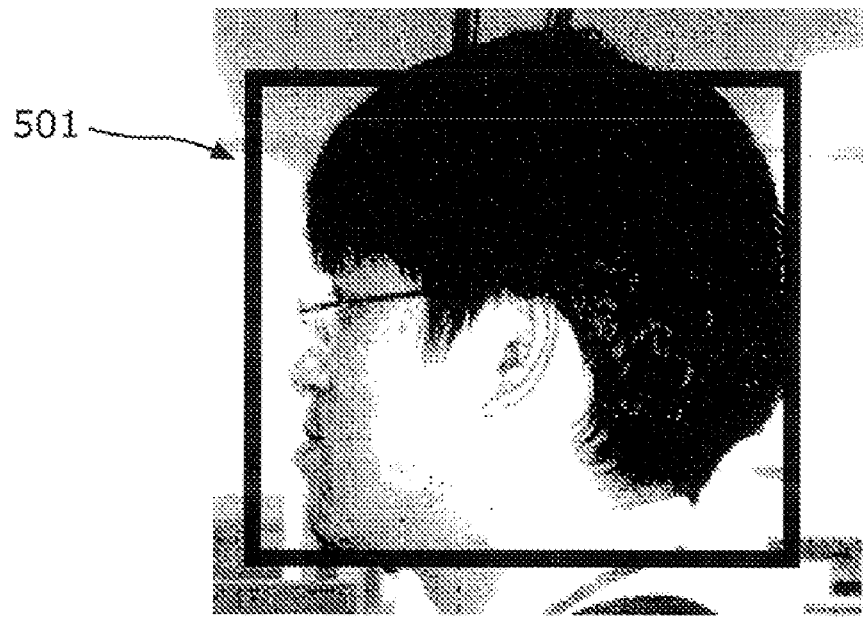
(a)
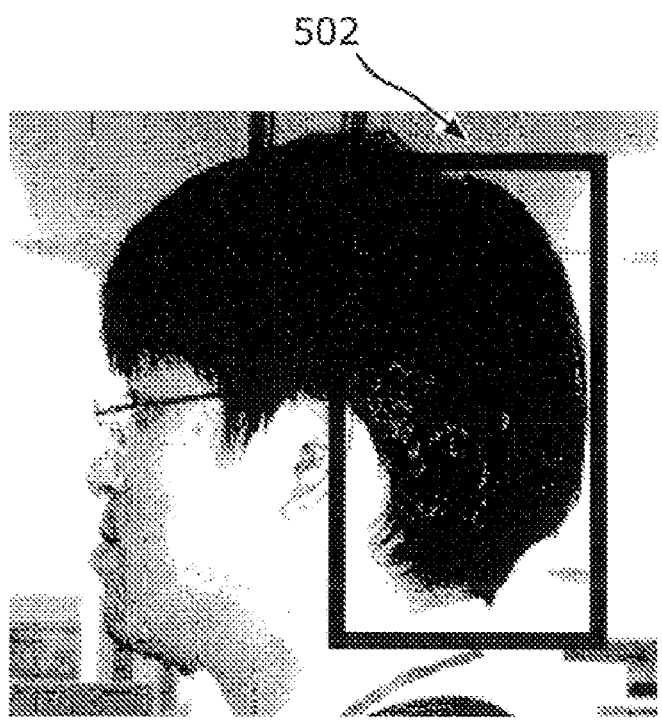
(b)

FIG. 10
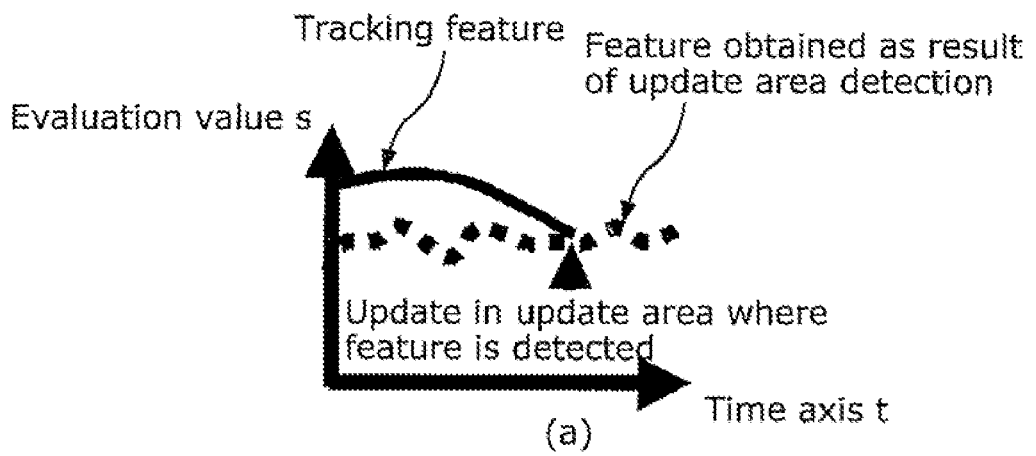
(a)
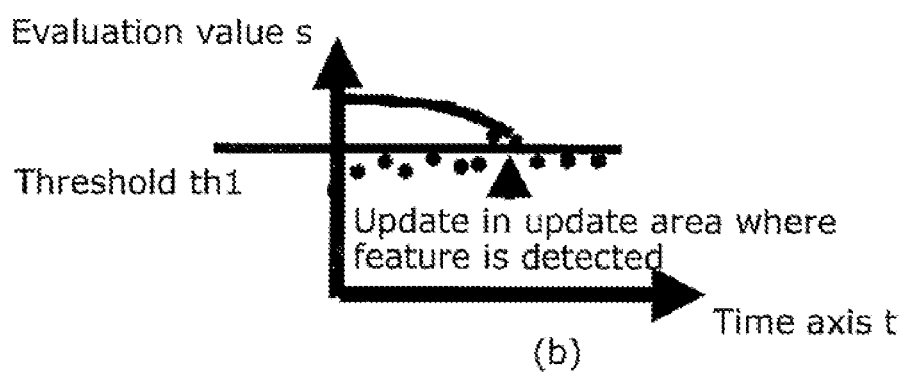
(b)
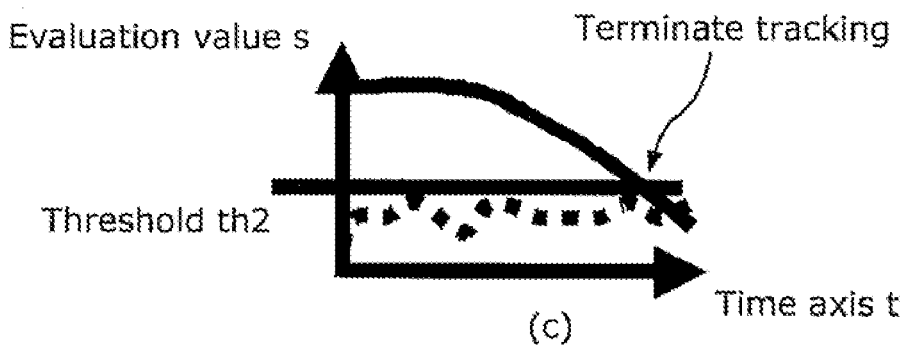
(c)

ELECTRONIC CAMERA AND IMAGE PROCESSING METHOD

TECHNICAL FIELD

The present invention relates to an electronic camera which tracks an object in an image and displays a result of the tracking on a display, and also relates to a method used for the electronic camera.

BACKGROUND ART

In recent years, a face-detection function has been incorporated in an electronic camera as a means for alignment in functions of auto focus (AF), auto exposure (AE), and backlight correction. Use of such a face-detection function which allows automatic focusing on an object effectively supports a user in image capturing.

As an image processing device and a technique for face detection, proposed is a method to learn patterns of a face and a non-face object (hereinafter, referred to as non-face) and to distinguish between the face and the non-face using a distinguishing device which holds parameters thus learned (See Patent Reference 1).

FIG. 1 shows an image processing device as disclosed in Patent Reference 1. FIG. 2 is a diagram showing an example of clipping a partial image. A partial image clipping unit 900 clips a partial image 1000 from an input image 1001. The partial image 1000 is clipped by sequentially scanning windows in plural sizes, starting from the left top toward the right bottom of the image and gradually shifting to the right or to the bottom by an appropriate amount of pixels (for example, by one pixel) (FIG. 2). Note that the "clipping" is to read image data of a corresponding portion.

A feature amount evaluation unit 1(901) includes a combination of distinguishing devices. The distinguishing devices each calculate a feature amount at a specific position using a parameter learned by the boosting method, based on a rectangular feature to be described later (hereinafter, referred to as an adjacent difference filter). Then, the feature amount evaluation unit 1(901) distinguishes the partial image as non-face when a weighted linear sum of output values from the distinguishing devices is below a threshold that is calculated based on the learning, and terminates the process of discriminating the partial image. On the other hands, when the weighted linear sum is equal to or above the threshold, the feature amount evaluation unit 1(901) distinguishes the partial image as a face, and a feature amount evaluation unit 2(902) performs subsequent processing. The feature amount evaluation unit 2(902) performs evaluation using a parameter different from the learned parameter used by the feature amount evaluation unit 1(901). Thus, the evaluation value is calculated using plural feature amount evaluation units, so as to distinguish between the face and the non-face based on the calculated evaluation value.

FIGS. 3(a), (b), (c), and (d) illustrate the adjacent difference filter, and FIG. 3(e) is an example of applying the adjacent difference filter (b) to an image. The adjacent difference filter is indicated by a white rectangle and a black rectangle which are adjacent to each other, and outputs a difference between an average pixel value in the white rectangle and an average pixel value in the black rectangle. A feature of a facial part can be identified when there is a significant difference between the average pixel values output from the adjacent difference filter, which means an output of high-level feature amount in an area having a significant difference in pixel values between adjacent areas such as eyes or a mouth. For example, FIG. 3(e) calculates a feature amount based on the difference between a sum of pixel values in the black rectangle at a forehead position and a sum of pixel values in the white rectangle at an eyebrow position. Such a feature amount, which indicates a difference between pixel values of adjacent areas, strongly responds to a local feature within the image (for example, a line component), and allows an output of characteristic values in such facial parts as the eyes, eyebrows, and the mouth. Note that the adjacent difference filter is generally referred to as a Haar-like feature.

However, it is not possible to detect the face simply by such face detection within an area where the face (eye, nose, or mouth) is not visible, nor is it possible to track an object other than a face such as a pet. Thus, there is a method of automatically focusing the object other than a face by tracking the object based on information on the object previously registered by a user.

An object tracking method that has conventionally been used includes: a face tracking method by re-detecting the face only in the neighborhood area of a position at which a result of the face detection is obtained; template matching using a neighborhood search of a previous frame based on a correlation operation; a method based on an active search aimed at speeding up; and a method based on a particle filter or condensation which performs a search considering a motion prediction using statistical information based on probability distribution.

In these methods, an initial feature amount (a color histogram of colors or luminance, or a template image itself, shape, contour information, and so on) of the object intended to be tracked is previously registered using some technique. The object is tracked by searching, in the picture, for a position at which the image having a feature similar to the feature indicated by the registered feature amount, using the registered feature amount. In these methods, the initial feature amount is previously prepared, and matching is performed between this initial feature amount and the feature amount extracted at each position in the image.

However, the face of an object to be captured using general movie is not often visible for a long time but often significantly changes appearance on the image. The conventional method has a problem of easily losing track of the object when the object significantly changes appearance on the image.

To solve this problem, Patent Reference 2, for example, uses a method of sequentially updating a template. According to this method, even when the object to be tracked changes appearance, the template is updated according to the change. This allows tracking of the object changing appearance.

Patent Reference 1: US Patent Application Publication No. 2002/0102024.

Patent Reference 2: Japanese Unexamined Patent Application Publication No. 2002-157599.

DISCLOSURE OF INVENTION

Problems that Invention is to Solve

However, according to the method disclosed in Patent Reference 2, the template is updated for each frame, but this does not necessarily allow constant updating of the template using an area including only the object to be tracked. This method has a problem that an area that is not to be tracked is mixed with the area to be updated, which results in a failure in the subsequent tracking.

This case will be specifically described using FIG. 5. For example, it is assumed that a correct area of FIG. 5(a) is determined to be 200. At this time, the subsequent frame FIG. 5(*b*) matches FIG. 5(*a*) at position 201 because of similarity in boundary of the color of the hat. At this position, since the background is included in the left side of 201, the tracking to be performed in the subsequent frames involves the features of the background, thus causing a negative influence in the tracking of a head region. However, when matching with 202 is possible, it is possible to obtain a feature based on the entire head region, thus allowing stable tracking of the head region in the subsequent frames.

The present invention, in view of these conventional problems, is to eliminate mistracking of the area in which the object is present, by determining an update area using the feature which allows stable detection of the position of the object. In addition, when a displacement from the correct position increases as a result of the tracking, the present invention is to realize stable tracking by correcting the displacement to a proper position.

Means to Solve the Problems

To solve the problems described above, an electronic camera according to an aspect of the present invention is an electronic camera having a function to determine and display an object area in respective frames of images sequentially captured, the object area including an image of an object to be tracked, and the electronic camera includes: a tracking processing unit which searches a predetermined range in a frame included in the respective frames, using a first feature amount previously registered and quantitatively indicating a feature of the object, calculates a first evaluation value indicating a degree of matching between an image in an area obtained as a result of the search and the image of the object, and determines a target area estimated to include the image of the object, based on the first evaluation value calculated; an update area calculation unit which searches the predetermined range in the frame, using a second feature amount that is different from the first feature amount and quantitatively indicates a feature of the object, calculates a second evaluation value indicating a degree of matching between an image in an area obtained as a result of the search and the image of the object, and determines, within the frame, an update area for updating the first feature amount, based on the second evaluation value calculated; an update determination unit which determines whether or not to update the first feature amount by checking whether or not at least one of the first evaluation value and the second evaluation value satisfies a predetermined condition, the first evaluation value being calculated by the tracking processing unit, and the second evaluation value being calculated by the update area calculation unit; a registered feature amount updating unit which updates the first feature amount with another first feature amount extracted from the update area, when the update determination unit determines to update the first feature amount; and a tracking result drawing unit which determines, as the object area, the target area determined by the tracking processing unit and draws information on the target area when the update determination unit determines not to update the first feature amount, and determines, as the object area, the update area determined by the update area calculation unit and draws information on the update area when the update determination unit determines to update the first feature amount, and when the first feature amount that is previously registered is updated, the tracking processing unit determines another target area within another frame, using the updated first feature amount.

With this, in the electronic camera, it is possible to determine a location of the object in tracking the object, using a feature different from the feature for tracking the object or a shape that is a feature other than the feature for tracking the object. Then, this allows determination including determination regarding whether to perform updating constantly or under a predetermined condition, thus producing an advantageous effect of reducing updates using wrong positions.

In addition, the tracking processing unit may determine the target area estimated to include the image of the object, using color information of the object as the first feature amount, and the update area calculation unit may determine the update area, using shape information of the object as the second feature amount.

With this, it is possible to reliably track the object even when the appearance of the object changes.

Furthermore, the update determination unit may determine to update the first feature amount in one of cases where the second evaluation value calculated by the update area calculation unit is above the first evaluation value calculated by the tracking processing unit and where the second evaluation value calculated by the update area calculation unit is above a first threshold that is previously determined.

With this, since the first feature amount is updated when the evaluation value of the update area detection result is above the evaluation value of the tracking result or when the update area detection area result is above the first threshold, it is not necessary to perform updating each time, thus reducing the processing amount.

In addition, the update determination unit may set the first threshold to a larger value as an average saturation per pixel included in the image of the object increases, and may set the first threshold to a lower value as the average saturation of the object decreases. The update determination unit may determine to update the first feature amount in one of cases where the second evaluation value calculated by the update area calculation unit is above the first evaluation value calculated by the tracking processing unit and where the second evaluation value calculated by the update area calculation unit is above a first threshold that is previously determined. The tracking processing unit may determine the target area estimated to include the image of the object, using color information of the object as the first feature amount, and the update area calculation unit may determine the update area, using shape information of the object as the second feature amount.

With this, ease of tracking varies depending on the saturation value of the object to be tracked. In other words, a high saturation indicates a clearer color, indicating that the tracking using the first feature amount is more accurately performed. For this reason, by setting a larger first threshold when the saturation is higher, and a smaller first threshold when the saturation is lower, it is possible to determine whether or not to frequently update the first feature amount. Therefore, this allows flexible setting of the threshold according to the object, thus improving tracking accuracy.

In addition, the update determination unit may determine to update the first feature amount when a distance between the target area determined by the tracking processing unit and the update area determined by the update area calculation unit is equal to or above a second threshold that is previously determined.

With this, since it becomes possible to update the first feature amount when there is a large displacement in the position indicated by the result of the update area detection performed by the update area calculation unit, it becomes possible to return to the tracking process using the updated first feature amount even when the tracking fails, thus stabilizing the tracking performance.

In addition, the electronic camera may further include a termination determination unit which determines whether or not it is possible to continue tracking the object, and the termination determination unit may determine that it is not possible to continue tracking the object when both the first and second evaluation values are below a third threshold that is previously determined.

With this, the tracking processing can be automatically terminated when it is no longer possible to continue the tracking of the object, thus saving the user the trouble of terminating the processing.

In addition, the tracking result drawing unit may terminate the drawing of the target area and the update area when the termination determination unit determines that it is not possible to continue tracking the object.

With this, no redundant tracking result is displayed, thus giving the user no sense of discomfort.

Furthermore, the tracking result drawing unit may draw an image which shows the user that the tracking is not possible, when the termination determination unit determines that it is not possible to continue tracking the object.

With this, since the user can be notified of the end of the tracking, the user can move on to another action to determine whether or not to perform the tracking again.

In addition, the tracking result drawing unit may draw an image which prompts the user to perform resetting of an initial position, when the termination determination unit determines that it is not possible to continue tracking the object.

With this, since the user is prompted to perform the initial setting, even a user unfamiliar with handling can easily understand that resetting should be performed again.

Furthermore, the tracking result drawing unit may perform setting of an initial position by performing face detection from a start when the termination determination unit determines that it is not possible to continue tracking the object.

With this, when the target is a person, it is possible to automatically reset the initial position to the face region.

In addition, the electronic camera may further include: a face detection circuit which detects a face in the image in the respective frames; and a facing direction recognition circuit which recognizes a facing direction of the face detected by the face detection circuit, and the update area calculation unit may calculate an update reference area that is an area of the face looking sideways at a right angle when the facing direction recognition circuit recognizes that the face that is the object is a profile, and may subsequently calculate the update area in the update reference area, based on a predetermined positional relationship between a face portion and a hair portion.

With this, it becomes possible to perform updating in various positional relationships, for example, by changing the place for updating according to the face detection indicated by the result of the face detection, using a larger size according to the detected face size, or including the clothes, thus improving tracking accuracy.

With this, since tracking of the face becomes possible, it is possible to combine the technique with face authentication.

With this, for example, it is possible to stably track the tracking object which does not change appearance even when rotating such as a circular shape.

In addition, the electronic camera may further include a camera control unit which changes a camera parameter to adjust an operation of the electronic camera, based on one of the target area determined by the tracking processing unit and the update area determined by the update area calculation unit.

With this, since it becomes possible to control the camera parameter, it is possible to set the camera parameter according to the target.

The camera control unit may control, based on the camera parameter, an operation of at least one of a body and a head of the electronic camera, so as to perform control to adjust all or part, which is determined, of the object to a predetermined size and a predetermined position within the frame.

With this, through camera control, it is possible to control the camera at the position appropriate for the object.

The electronic camera may further include a target area initial setting unit which determines an initial position of the target area, based on an input given by the user or using a predetermined method.

With this, it becomes possible to set the initial position of the target area, thus allowing determining the initial position for the tracking.

The target area initial setting unit may determine, as the initial position, a detection position of at least one of a person and a face.

With this, it becomes possible to set the person or the face position as the initial position, thus allowing automatic initial setting for person tracking.

The target area initial setting unit may determine, as the initial position, an area on which the electronic camera is focused through an auto focus (AF) function.

With this, it becomes possible to track the area focused through the AF function as the initial setting, thus allowing collaboration with the AF function.

Note that the present invention can be realized not only as an apparatus but also as: a method including, as steps, processing units included in the apparatus; a program causing a computer to execute the steps; a computer-readable recording medium on which the program is recorded, such as a CD-ROM, and information, data, or a signal indicating the program; and so on. In addition, such program, information, data, and signal as these may be distributed via the communications network such as the Internet.

Effects of the Invention

According to the present invention, since the object can be tracked even when the object to be tracked changes appearance, it is also possible to track the object even when the object is looking back, to continue displaying a frame, and to perform framing functions through AE, AF, and camera control and automatic capturing.

BRIEF DESCRIPTION OF DRAWINGS

FIG. 3($a$) to ($e$) is an illustrative diagram of a conventional adjacent difference filter.

FIGS. 5($a$) and ($b$) is an illustrative diagram of an example of a failure in tracking in a conventional method.

FIGS. 6($a$) and ($b$) is an illustrative diagram of a color histogram search.

FIGS. 8(a) and (b) is an illustrative diagram of a profile reference image area.

FIG. 10(a) to (c) is a relationship diagram of a tracking feature amount and an update area detection result.

NUMERICAL REFERENCES

Figure 1:
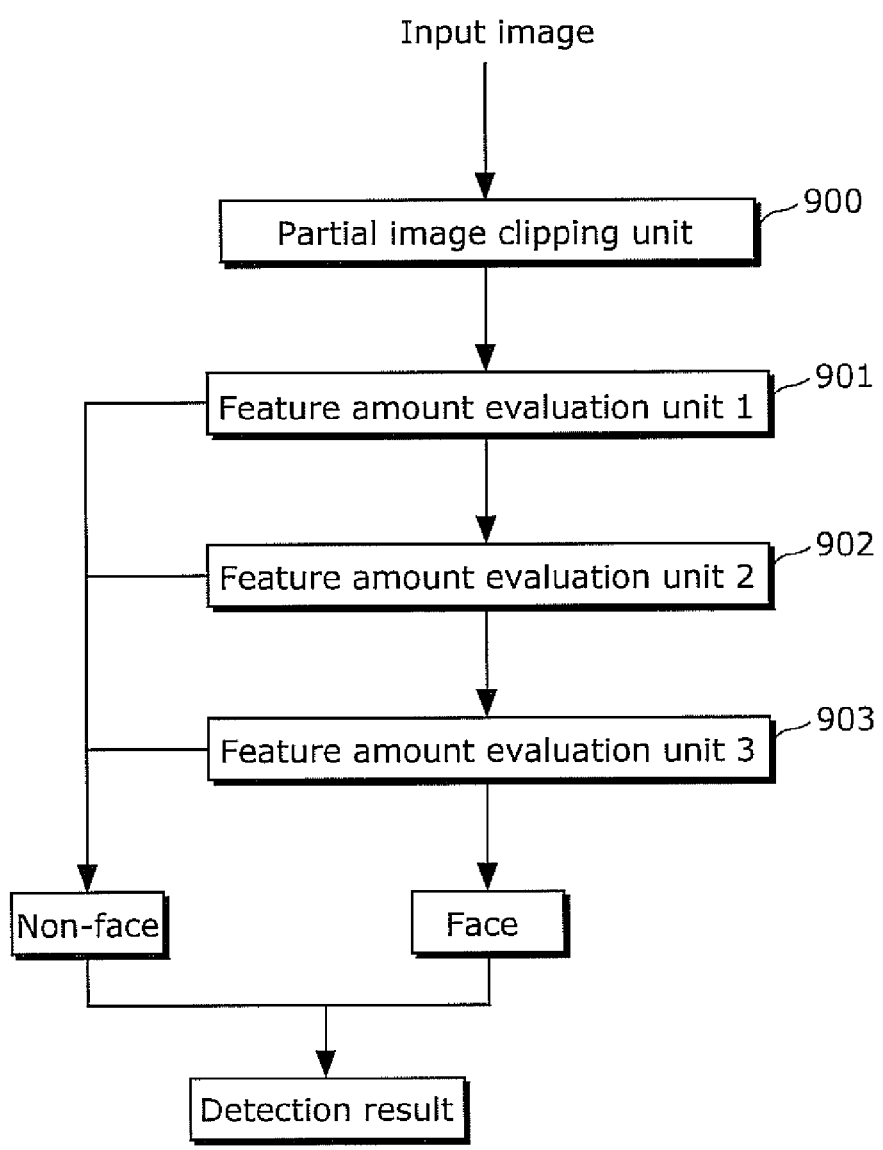
FIG. 1 is a flowchart of a conventional face detection process.
Figure 2:
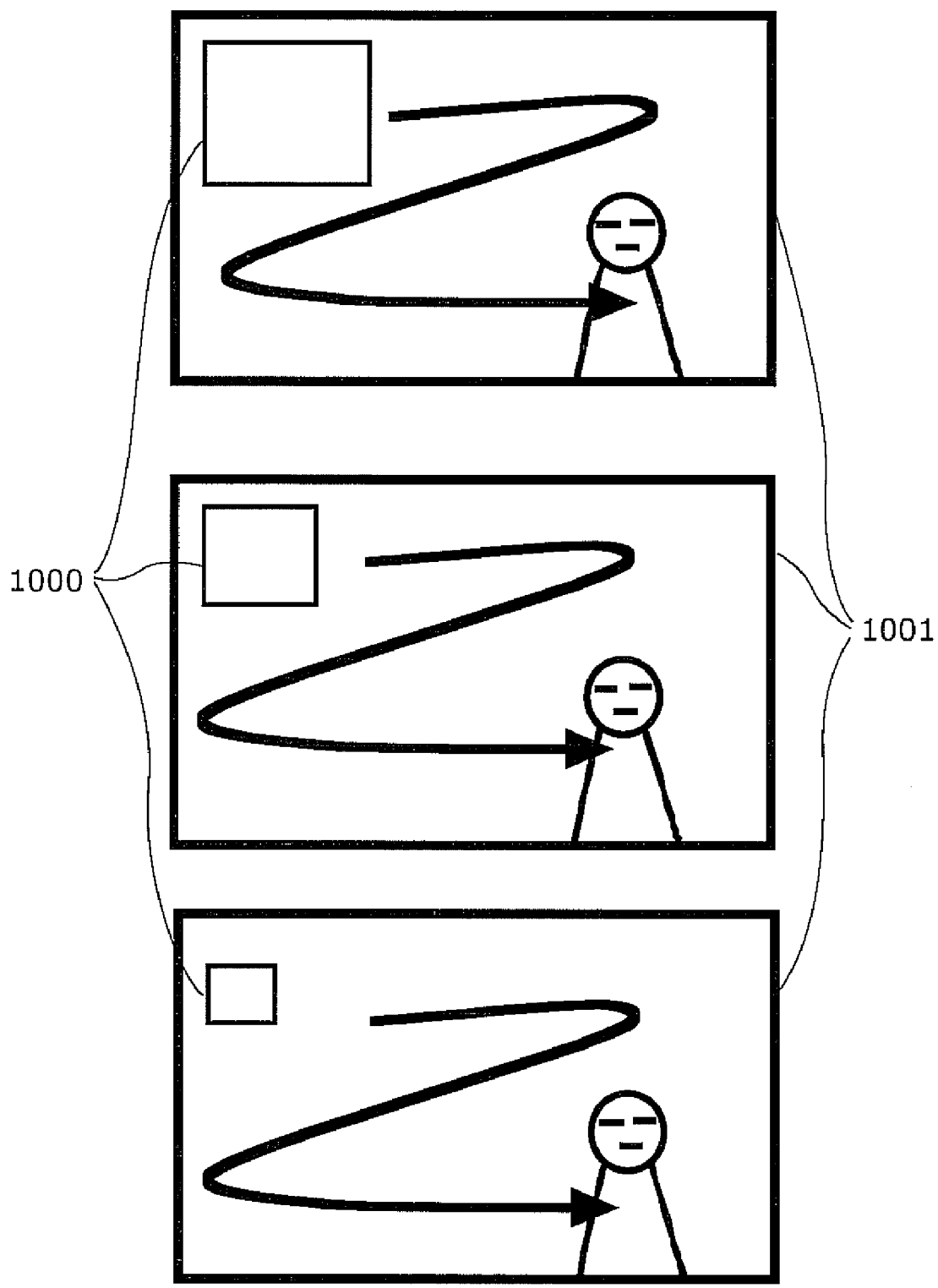
FIG. 2 is an illustrative diagram of the conventional face detection process based on an image.

100 Image processing device (electronic camera)
101 Lens
102 Shutter
103 Imaging element
104 AD converter
105 Timing generation circuit
106 DA converter
107 Memory control circuit
108 System control circuit
109 Image processing circuit
110 Image display memory
111 Memory
112 Resizing circuit
113 Flash
114 Range control unit
115 Zoom control unit
116 Barrier control unit
117 Protection unit
118 Memory
119 Display unit
120 Nonvolatile memory
121 Mode dial
123 Shutter switch
124 Recording unit
125 Power supply control unit
126 Power supply unit
127 Connector
128 Power supply unit
129 Interface
130 Interface
131 Connector
132 Connector
133 Optical finder
134 Communication unit
135 Antenna
136 Initial feature amount extraction unit
137 Tracking processing unit
138 Tracking first frame specifying circuit
139 Update area detection circuit
140 Update determination circuit
141 Termination determination circuit
142 Position correction circuit
143 Registered feature amount updating circuit
144 Tracking result drawing circuit
145 Camera control circuit
146 Face detection circuit
147 Facing direction recognition circuit
148 Image display unit
149 Exposure control unit
200 Tracking result in Frame (a)
201 Tracking result in Frame (b)
202 Correct position in Frame (b)
301 Search area
302 Tracking window
303 Tracking window area color histogram
401 Reference image color histogram
402 Input picture color histogram
501 Face detection area
502 Reference area
S601 Input image step
S602 Face detection step
S603 Facing direction recognition step
S604 Initial registered feature amount extraction step
S605 Tracking processing step
S606 Face detection step
S607 Face detection determination step
S608 Initial registered feature amount extraction step
S609 Tracking frame display unit and camera control step
S610 Tracking evaluation value comparison step
S611 Tracking processing step
S612 Initial registered feature amount updating step
S801 Input image step
S802 Face detection step
S803 Initial registered feature amount extraction step
S804 Tracking processing step
S805 Circle detection step
S806 Tracking termination determination step
S807 Feature amount update determination step
S808 Feature amount updating step
S809 Tracking frame display unit and camera control step
S810 Tracking termination step
900 Partial image clipping unit
901 Feature amount evaluation unit 1
902 Feature amount evaluation unit 2
903 Feature amount evaluation unit 3
1000 Partial image
1001 Input image

BEST MODE FOR CARRYING OUT THE INVENTION

First Embodiment

A first embodiment describes an image processing device which allows tracking of a head region which has turned around and is therefore not detectable only through face detection, by performing tracking using color information concurrently with the face detection. In other words, the image processing device (electronic camera) according to the first embodiment determines a target area in which an object to be captured by the tracking is likely to be present, using conventional techniques of face detection and facing direction recognition. Then, the image processing device according to the first embodiment extracts and updates a color feature amount of the object each time a target area is determined for each frame. In the case of a failure in the face detection, the image processing device determines the target area using the updated color feature of the object, and updates the registered color feature amount.

Figure 4:
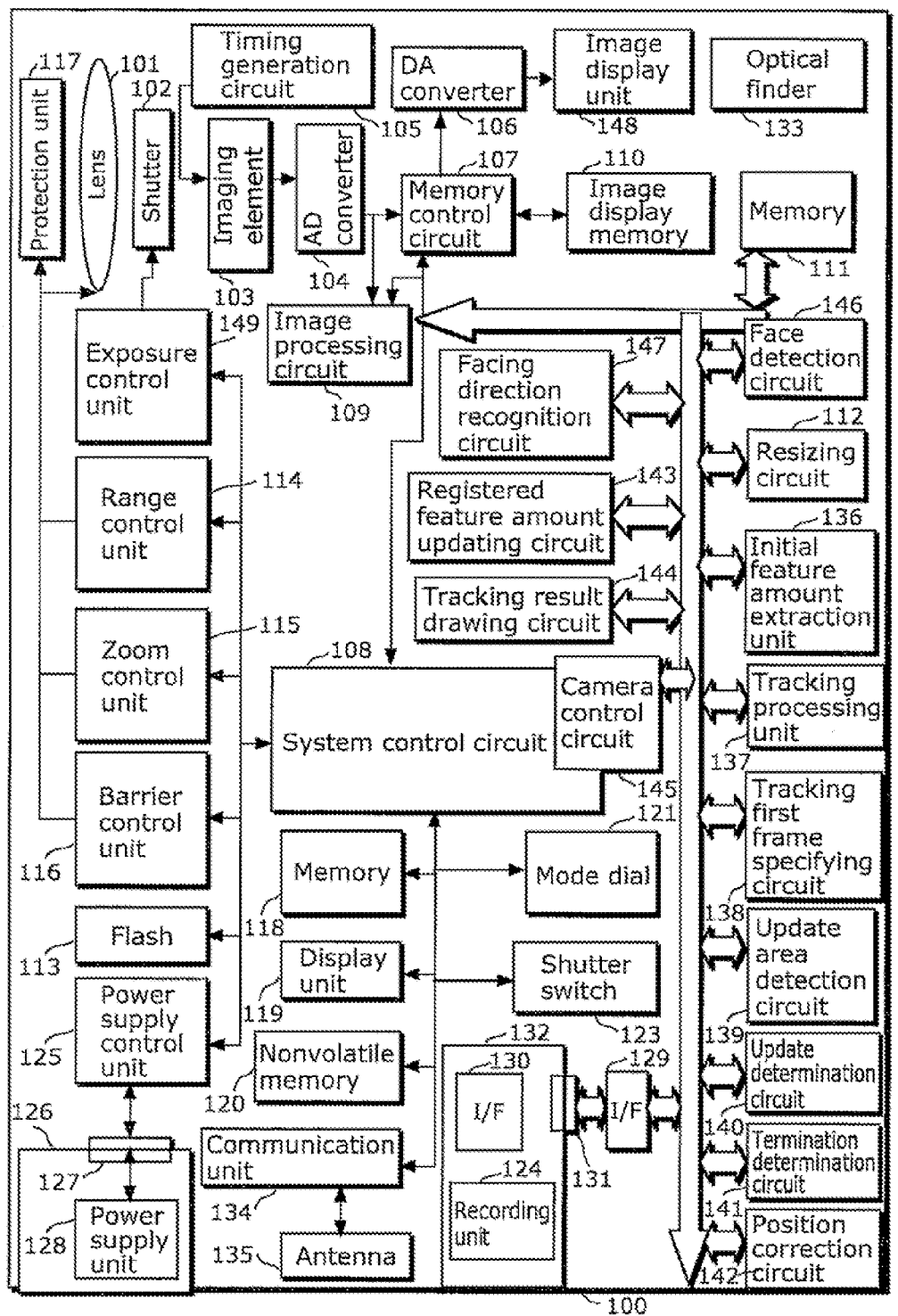
FIG. 4 is a block diagram of an image processing device in first and second embodiments of the present invention.

FIG. 4 is a diagram showing a configuration of an electronic camera in the first embodiment of the present invention. In FIG. 4, 100 is an electronic camera. 101 is a lens, 102 is a shutter with a diaphragm function, 103 is an imaging element which converts an optical image into an electric signal, 104 is an analog-digital (AD) converter which converts an analog signal output from the imaging element 103 into a digital signal.

The timing generation circuit 105 supplies a clock signal and a control signal to the imaging element 103, the AD converter 104, and a digital-analog (DA) converter 106. The timing generation circuit 105 is controlled by a memory control circuit 107 and a system control circuit 108.

An image processing circuit 109 performs predetermined image interpolation and color conversion processing on the data from the AD converter 104 or the data from the memory control circuit 107.

In addition, the image processing circuit 109 performs a predetermined computation using image data that is captured, and the system control circuit 108 controls an exposure control unit 149 and a range control unit 114, based on the obtained result of the computation.

The memory control circuit 107 controls the AD converter 104, the timing generation circuit 105, the image processing circuit 109, the image display memory 110, the DA converter 106, a memory 111, and a resizing circuit 112.

The data of the AD converter 104 is written into the image display memory 110 or the memory 111 via the image processing circuit 109 and the memory control circuit 107, or directly via the memory control circuit 107.

110 is the image display memory, 106 is the DA converter, and 148 is an image display unit including a thin film transistor liquid crystal display (TFT-LCD), and the image data for display, which is written into the image display memory 110, is displayed by the image display unit 148 via the DA converter 106.

The resizing circuit 112 generates a resized image that is a low resolution image, based on a frame image of captured video. The resizing circuit 112 is used for recording image data on a recording medium, using a pixel number (size) different from the pixel number of the imaging element 103.

In addition, the image display unit 148, which has a considerably smaller pixel number than the imaging element 103, is therefore used for generating a display image when performing display in the image display unit 148. The resolution of the resized image is to be selected from among plural predetermined resolutions according to the intended use. The resizing circuit 112 reads the image stored in the memory 111 and performs resizing, and writes the processed data into the memory 111.

The exposure control unit 149 controls the shutter 102 having a diaphragm function, and has a flash light control function by operating in collaboration with a flash 113.

The range control unit 114 controls focusing of the lens 101. The zoom control unit 115 controls zooming of the lens 101. The barrier control unit 116 controls an operation of a protection unit 117 that is a barrier.

The flash 113 also has a floodlight function of AF assist light and a flash light control function.

The system control circuit 108 controls the entire image processing device (electronic camera) 100, and the memory 118 records a constant, a variable, a program, and so on for performing the operation of the system control circuit 108.

The display unit 119 is a display unit including a liquid crystal display apparatus which displays an operational state or a message, using text, images, voice or the like, and a speaker. The display unit 119 is provided at one or more points in an apparatus which is easy to visually recognize in the vicinity of the operation unit, and includes, for example, a combination of an LCD, a light emitting diode (LED), a sounding element, and so on.

The nonvolatile memory 120 is a memory that is electrically erasable and recordable, and EEPROM, for example, is used.

A mode dial 121 can set each function mode by switching between: automatic capturing mode, capturing mode, panoramic capturing mode, reproduction mode, and so on.

A shutter switch 123, which is a shutter switch SW1, turns on during the operation of a shutter button not shown in the figure, so as to instruct to start operations such as AF processing, AE processing, and auto-white balance (AWB) processing.

The shutter switch 123, which is a shutter switch SW2, turns on during the operation of the shutter button not shown in the figure, so as to instruct to start performing a series of processes from an exposure process for writing, into the memory 111 via the AD converter 104 and the memory control circuit 107, a signal that is read out from the imaging element 103, to a development process using computation performed by the image processing circuit 109 and the memory control circuit 107, and to a recording process for reading the image data from the memory 111 and writing the image data into the recording unit 124.

A power supply control unit 125 includes a battery detection circuit, a DC-DC converter, and a switch circuit which switches the block to be supplied with an electric current, detects whether or not a battery is equipped, a type of the battery, and a remaining battery level, controls the DC-DC converter based on the detection result and the instruction from the system control circuit 108, and supplies a necessary voltage to respective units including a recording medium for a necessary period of time.

A power supply unit 126 is a power supply including: a connector 127, a power supply unit 128 realized as a primary battery such as an alkali battery or a lithium battery, or a secondary battery such as a NiCd battery, a NiMH battery, a Li battery or the like; and an AC adopter.

Interfaces 129 and 130 are an interface with a memory card, a hard disk, and so on, and connectors 131 and 132 connect a recording medium such as the memory card and the hard disk to the main body. The protection unit 117 is a barrier which covers an imaging unit to prevent dirt or breakage of the imaging unit which includes the lens 101 in the image processing device (electronic camera) 100.

An optical finder 133 can perform capturing using only the optical finder, without using an electronic finder function performed by the image display unit 148.

A communication unit 134 has a communication function of different types such as RS232C, universal serial bus (USB), IEEE 1394, modem, LAN, and wireless communication.

An antenna 135 is a connector which connects the image processing device (electronic camera) 100 to another device via the communication unit 134, or an antenna used in wireless communication.

An initial feature amount extraction unit 136 extracts an initial feature amount from the image data stored in the memory 111, and writes the extracted initial feature amount into the memory 111. Coordinates for extracting the initial feature amount can be manually set by user definition using a touch panel, or can be automatically set according to a face detection position, an AF area which is set by pressing the shutter switch SW1, or the like.

A tracking processing unit 137 reads a registered feature amount from the memory 111, performs tracking, and writes a tracking result (coordinate data and evaluation value) into the memory 111. Note that the evaluation value is a value indicating similarity between the registered feature amount and the feature amount of the target area, and is hereafter described with reference to an example case of a larger evaluation value indicating higher reliability, that is, the case of a higher matching degree.

A tracking first frame specifying circuit 138 determines whether or not the current frame is a first frame in the tracking in the image data, and writes a result of the determination into the memory 111.

An update area detection circuit 139 detects an update area, and writes a result of the update area detection (coordinate data and evaluation value) into the memory 111. Note that, in the update area, the evaluation value is also a value indicating similarity between the registered feature amount and the feature amount of the target area, and an example described below is the case of a larger evaluation value indicating higher reliability, that is, the case of a higher matching degree.

An update determination circuit 140 determines whether or not to update the registered feature amount held in the memory 111, and writes a result of the determination into the memory 111.

A termination determination circuit 141 writes the result of the determination as to whether or not to terminate the tracking, into the memory 111.

A position correction circuit 142 corrects the tracking result stored in the memory 111, based on positional relationship information DB including a positional relationship between the result of the update area detection and the tracking result that are previously held in the memory 111.

A registered feature amount updating circuit 143 updates the registered feature amount recorded in the memory 111, using the feature of the area as the result of the update area detection, when the tracking result and the update detection result are in a relationship that is to be described later.

To cause the tracking result written into the memory 111 to be displayed on the LCD, a tracking result drawing circuit 144 performs processing on the display image data written into the image display memory 110, by rendering information indicating that tracking has been performed, for example, a tracking frame, mosaic, text, change in display color, or grading, in an area obtained as the result of the tracking.

To cause the tracking result written into the memory 111 to be displayed on the LCD, the tracking result drawing circuit 144 performs processing on the display image data written into the image display memory 110, by rendering information indicating that tracking has been performed, for example, a tracking frame, mosaic, text, change in display color, or grading, in the area obtained as a result of the tracking or the area obtained as a result of the update area detection.

A camera control circuit 145 controls a camera so as to allocate an entire object in predetermined size at a predetermined position (for example, allocating the face in the center or zooming in to display the entire body), based on the position and size of the tracking result written into the memory 111.

A face detection circuit 146 performs face detection using the image and writes the result of the face detection (position, size, and evaluation value) into the memory 111.

A facing direction recognition circuit 147 recognizes in which direction, among vertical and horizontal directions, the face detected by the face detection circuit 146 is looking, and writes the result of the detection into the memory 111.

In the case where one of these circuits 136, 137, 138, 139, 140, 141, 142, 143, and 144 is not included, tracking and update processing may be performed through software processing using a flow that is to be described later.

Figure 7:
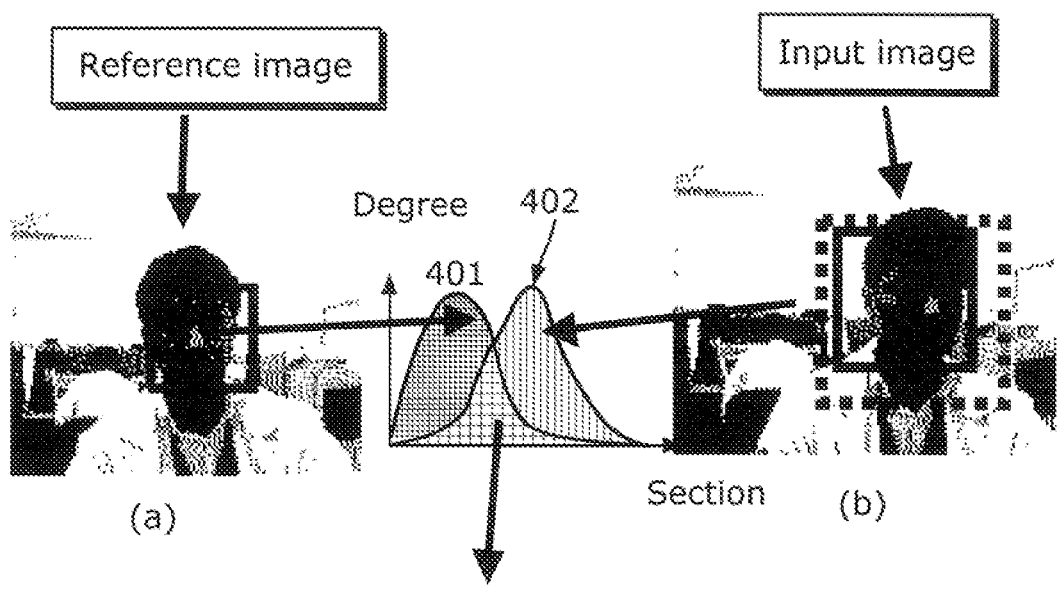
FIGS. 7($a$) and ($b$) is an illustrative diagram of a color histogram search.

An operation of the image processing device 100 will be described below with reference to FIGS. 6 and 7.

The system control circuit 108 performs a capturing process including: an exposure process for writing the captured image data into the memory 111 via the imaging element 103, the AD converter 104, the image processing circuit 109, and the memory control circuit 107, and a development process for reading the image data written into the memory 111 so as to perform various types of processing.

Upon completing the capturing processing, the system control circuit 108 generates, using the resizing circuit 112, a display image for displaying the captured image in the image display unit 148, with respect to the image data written in the memory 111. Likewise, the system control circuit 108 causes the resizing circuit 112 to resize the image into a size of the image to be input into the face detection circuit (quarter video graphics array (QVGA) or the like), and stores the image for face detection in the memory 111.

The system control circuit 108 causes the face detection circuit 146 to perform the processing of face detection using a conventional technique, on the image data for the face detection stored in the memory 111, and to store the result of the processing in the memory 111.

In addition, the system control circuit 108 causes the facing direction recognition circuit 147 to perform the processing of facing direction recognition using a conventional technique, and to store the result of the processing in the memory 111.

When the face detection circuit 146 detects a face, the initial feature amount extraction unit 136 extracts the registered feature amount with reference to the results of the face detection and the face detection recognition which are stored in the memory 111, and writes the registered feature amount into the memory 111. For example, the initial feature amount extraction unit 136 extracts a color histogram of the face as the color feature amount, based on the result of the face detection and facing direction information that are stored in the memory 111, and registers the color histogram of the face with the memory 111. In addition, the tracking processing unit 137 performs tracking processing, using the feature amount registered with the memory 111 by the initial feature amount extraction unit 136.

Here, extraction of the registered feature amount using the color histogram and tracking processing will be described using FIG. 6.

It is assumed that a frontal face is detected from an image as shown in FIG. 6(*a*). At this time, a color histogram of the area (reference area) is created. Specifically, on a horizontal axis of the histogram, a value H (a real number from 0 to 360) of a hue saturation value (HSV) color space for each pixel obtained from the reference area is assigned to an area divided into 20 sections. In addition, the number of values assigned to each section represents a degree. It is possible to calculate to which area the value H of each pixel in the reference area belongs, according to: [$Hi*18/360$] $Hi*19/360$ where the value H of an i-th pixel is Hi. Then, the degree of each section is divided by the number of pixels in the reference area so that a sum of the degrees becomes 1, to be normalized. Then, as shown in FIG. 6(*b*), an area 301 which is extended from the detected area within a predetermined range is determined as a search area, and a search is performed while changing the size and position of the tracking window 302. The tracking processing unit 137 generates, concurrently with the tracking, a color histogram 303 of a tracking window area.

Next, a value of similarity is calculated based on the color histogram of the reference area and the color histogram of the tracking window area. A method of calculating similarity will be described using FIG. 7. FIG. 7(*a*) is a reference image, and 401 is a color histogram calculated from the reference image. In addition, FIG. 7(*b*) is an input image showing a color histogram of the tracking window in 402. Thus, similarity, that is, an evaluation value is calculated based on the degree of overlapping of respective color histograms. The similarity is calculated according to (Expression 1).

$$S_{RI} = \sum_{i=1}^{dim} \text{Min}(R_i, I_i) \quad \text{(Expression 1)}$$

Here, Ri represents a degree of an i-th section in the reference area color histogram where Ii represents a degree of an i-th section in the tracking window area color histogram.

Here, i is a value from 0 to 19. This example has been described using a histogram divided into a value 20, but any value that is 1 or larger may be used. Note that the value is changed according to complexity of the target. In the case of an object including plural colors, it is possible to improve accuracy by increasing the value and considering the difference according to finer segmentation. On the other hand, in the case of an object having a small number of colors, it is possible to perform tracking using a smaller memory by decreasing the value and considering the difference according to rougher segmentation.

Note that in the method of determining the reference area, the face detection position has been determined, but the user may use a touch panel, pointer, or the like, or may use music information, so as to determine the reference area. In addition, a technique of matching using the color histogram has been described above, but a difference between templates clipped from images may also be calculated. In addition, by correcting the color histogram of these templates as pre-processing, it is possible to reduce the influence of luminance to the matching. The difference may be calculated by any method that allows general calculation of the distance, such as a method of minimizing a least square distance or a method using normalized correlation. In addition, as a search method, the method of simply scanning the area has been described, but another search method based on probability distribution, such as a particle filter, may be used.

Next, a method of extracting the registered feature amount according to the facing direction is described. In detecting a frontal face, it is possible to perform reliable tracking by registering the entire face. However, when the face turns from the front to the side, the face is likely to look back in a subsequent frame, and therefore the register position of the feature amount is selected as follows. As shown in FIG. 8(a), in detecting a face in profile, the face detection area 501 includes both skin color information and hair color information. Here, as shown in FIG. 8(b), once the hair color information is obtained through the face detection processing, based on the reference area 502 which is determined to be around 20% of the back of the head within the face detection area, it is possible to perform tracking using the color indicated by the hair color information even when the object is looking back. Note that it is possible to perform more stable tracking by changing this percentage depending on each case, such as the cases where the object is likely to face front and where the object is likely to look back.

Note that the present example has been described using hair, but the technique according to the present embodiment effectively functions even when the object is wearing a cap or clothes having small color variation.

Note that when the face is detected and is located at a given distance from the tracking result, the update area detection circuit 139 sets a flag indicating a result of the determination as to whether or not to perform updating, and writes the flag into the memory 111. Then, the position correction circuit 142 corrects the face detection position.

A registered feature amount is extracted based on the face detection position, and the registered feature amount updating circuit 143 updates the registered feature amount, and writes the updated registered feature amount into the memory 111. The extraction of the registered feature amount is performed in the same manner as described earlier.

By thus changing the extraction area for the registered feature amount according to the facing direction, even when the face in profile turns around, it is possible to register, with reference to hair or a hat, an appropriate color feature according to change in the facing direction, thus allowing stable tracking even when the object is looking back. In addition, even when the tracking processing fails, it is possible to perform stable face tracking by correcting, in the position correction circuit 142, the position based on the face detection result and updating the tracking result in the memory 111.

In addition, in some cases, the face detection detects only an inner side of the face. Thus, it is possible to perform stable tracking by multiplying the coordinates of the detection result by a constant so as to include the head region.

In addition, it is possible to perform more reliable tracking by holding the information indicating that the object has looked back, and changing the extraction area from which to extract the feature amount when the face turns from the back to the front. A specific description is given below. When the object looks back, and then turns to the side, the object is more likely to face the front. Thus, by determining the feature amount extraction area as not the reference area 502 but an area closer to the face in the face detection area 501, it is possible to prepare for the next appearance of the face. With this, during such transition from the back, to the side, and to the front, it is possible to use skin color information, thus stabilizing the returning from the back to the front.

Since tracking is possible even when the object is looking back, it is possible to perform, even in the case of the object looking back, automatic framing and automatic capturing through controls such as AE and AF or camera control by the camera control circuit 145, in addition to user interface (UI) controls performed in the tracking result drawing circuit, such as displaying the tracking frame or grading the tracking result area.

Figure 9:
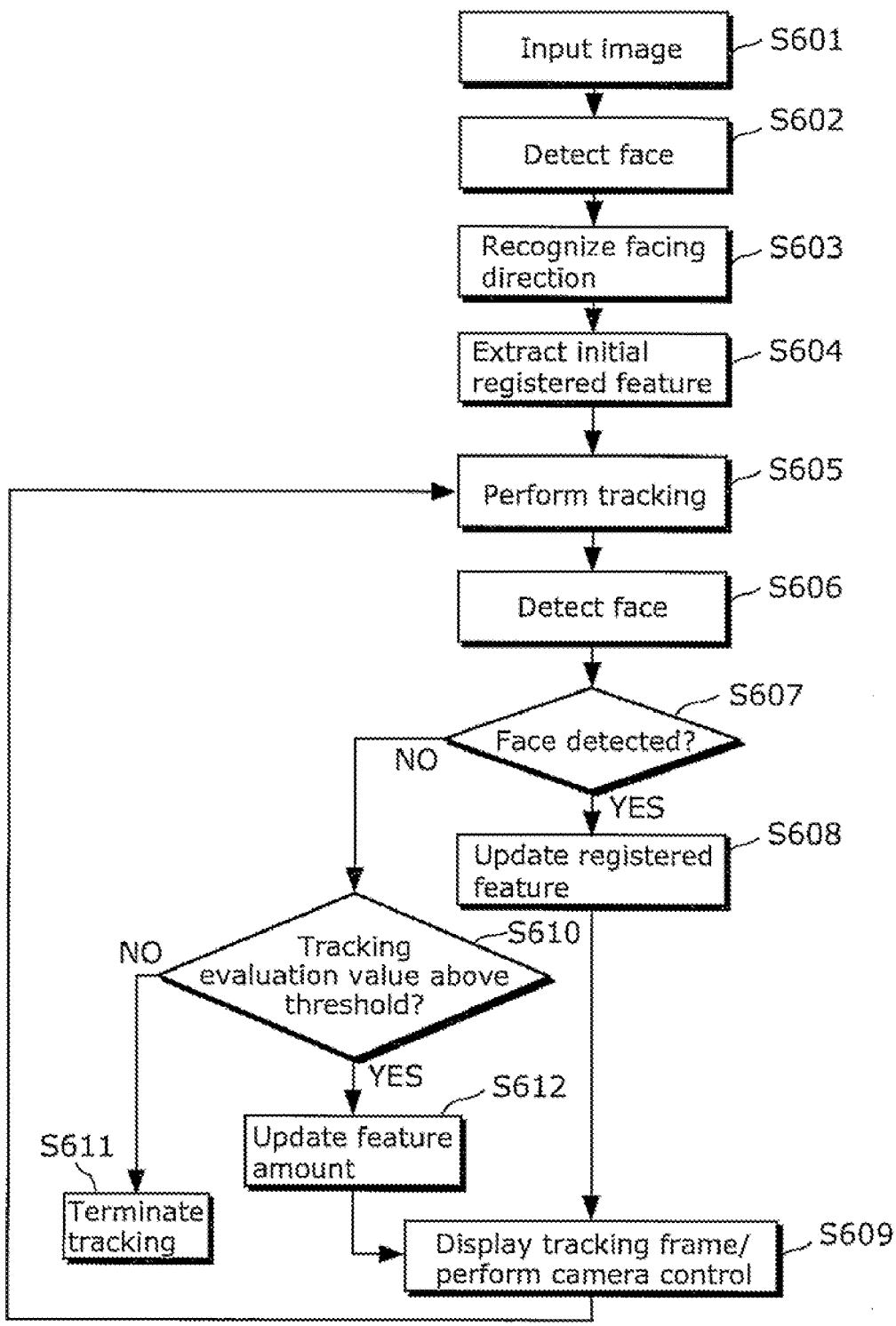
FIG. 9 is a flowchart of the first embodiment.

FIG. 9 shows steps when the above processing is executed by a program. An input image is captured, and a face detection process (S602) is performed on the captured input data (S601). Note that a conventional technique is also used for the face detection. Next, a facing direction recognition process (S603) is performed on the result of the face detection. This facing direction recognition also uses a conventional technique. Then, an initial registered color feature is detected from the face detection position (S604). Furthermore, in a subsequent frame, a tracking process (S605) for determining the target area using the color feature is performed, and a face detection process (S606) is subsequently performed. When the face can be detected (S607), the face detection position is replaced with the target area which is the result of the tracking, based on the result of the facing direction recognition. When the face cannot be detected, tracking processing using the color feature amount is performed, and a tracking value related to the color feature amount is calculated. When the evaluation value of the tracking result is equal to or below a threshold, the tracking process is terminated (S611). In addition, when the evaluation value of the tracking result is above the threshold, a color feature represented by the color histogram is extracted from an initial position within the target area, and the control proceeds to the display of the tracking frame and camera control after the initial registered feature amount is updated (S612). Then, when the face detection can be performed, the point at which the initial registered feature amount is to be updated is selected based on the result of the facing direction detection, and the initial registered feature amount is updated (S608). Then, an LCD display of the position at which the tracking result is to updated, that is, the target area, and camera control are performed (S609). Subsequently, the processing returns to the tracking process (S605), to be repeated.

Second Embodiment

In a second embodiment, an electronic camera which allows tracking using information that does not vary depending on rotation such as circular information, and also allows tracking of a head (not only a face looking front but also the face looking back when the face is not seen). Specifically, in the second embodiment, a position of the update area for updating a color feature is determined using circular information instead of facing direction information.

Since the configuration of the second embodiment is the same as the configuration shown in FIG. 4, the description of constituent elements having the same operation will be omitted.

In the second embodiment, the tracking processing is described as being performed, as in the first embodiment, by calculating similarity that is an evaluation value, using color histogram matching.

In the second embodiment, using the same method as in the first embodiment, an initial position of an object is determined according to face detection information and an instruction from the user (through a touch panel or a pointer), and an initial feature amount is registered.

Information that does not vary depending on appearances of the head region indicates that "the head has a circular shape". Thus, in the second embodiment, an example where the update detection circuit 139 detects an update area using shape information will be described. Any feature may be used as long as it does not vary depending on appearances of the object.

A method for detecting the circular shape of the head is described. Edge detection is performed in the neighborhood of the tracking result stored in the memory 111. The Sobel operator is used for the edge detection. Alternatively, another method of using a difference point based on an inter-frame difference is used. Hough transform is performed on a point group (feature point group) obtained here, so as to calculate a radius and a center of the circle. For the calculation method of the radius and the center of the circle, it is possible to use the method described in, for example: "Head Finder: "Person tracking based on inter-frame difference", Baba et al. (Non Patent Reference: 1). The technique described in Non Patent Reference 1 above is briefly described below.

A circle can be determined by constants of coordinates of a center of the circle (a, b) and a radius r, using (Expression 2).

$$(x-a)^2+(y-b)^2=r^2 \qquad \text{(Expression 2)}$$

When applying this to Hough transform, the number of unknowns is calculated to be three, indicating a three-dimensional voting space. Since this requires a vast amount of calculation, it is difficult to perform the processing in a substantial manner. Thus, this is limited to the radius r of given largeness. Subsequently, radius parameters a and b are obtained by voting using a feature point group included in each of a range of radiuses. This allows estimating the circular shape of the head. At this time, the number of feature point groups included on the circle is determined as an evaluation value indicating a fitting degree of the circular shape. The position, radius information, and evaluation value of this circular shape are written into the memory 111.

Here, it is to be noted that the head region, although having a low evaluation value, can be reliably detected in response to change in the facing direction, whereas color information has an evaluation value which decreases when the facing direction changes. The following will describe a tracking method of performing, when the evaluation value for color information decreases due to change in appearance, stable tracking in response to change in appearance, by correcting the position at the point at which the circular shape of the head is detected and then correcting the registered feature amount.

The update determination circuit 140 reads, from the memory 111, the evaluation values of the result of the tracking using colors and the result of the update area detection, and when the evaluation value of the tracking result is below the evaluation value of the update area detection result or below a threshold th1, the update determination circuit 140 determines whether or not to perform updating and writes the result of the determination into the memory 111. FIG. 10 shows the evaluation value and the time axis at this time.

FIG. 10(a) shows that updating is performed when the evaluation value of the update area detection result is above the evaluation value of the tracking result. In FIGS. 10(a), (b), and (c), a solid line indicates the evaluation value of the tracking result, and a dotted line indicates the evaluation value of the update area detection result.

Evaluation value of tracking result<Evaluation value
of update area detection result (Expression 3)

In this case, it is possible to perform updating in such a manner as to allow a recovery in case of a tracking failure, which phenomenon is caused by decrease in the evaluation value due to change in the appearance of the entire object.

FIG. 10(b) shows that updating is performed when the evaluation value of the update area detection result is above the threshold th1.

th1<Evaluation value of update area detection result (Expression 4)

In this case, stability of the update area detection result is ensured. In this case, the position of the tracking result is corrected to the position of the update area detection result. This allows establishment of a stable system because it is possible to use the method shown in FIG. 10(b) when the object is sufficiently trackable using the update area detection result, and otherwise to effectively select one of the methods for the object which is not.

Furthermore, the timing of updating is described. The change in color evaluation value differs depending on color complexity of the registered color or the object. For example, in the case of high average saturation, the evaluation value of the tracking using colors is high and tends to slowly decrease along with change in appearance.

Thus, for the object having high average saturation, it is possible to reduce the frequency of circle detection, thus reducing a processing amount as a whole. In addition, in the case of low average saturation, it is difficult to perform tracking using color histograms, and the evaluation value tends to rapidly decrease. Thus, in the case of low average saturation, stable tracking becomes possible by frequently performing circle detection. Note that in the case of low average saturation, the update area determined by circle detection may be determined as the target area.

In addition, the method of updating based on the relationship between evaluation values has been described above, but another method is to perform updating using the position at which the tracking result by color is obtained, that is, the distance relationship between the target area and the position of the circle detection, that is, the update area. For example, assuming that an allowable range is within a range double the radius of the detected circle, when the position of the tracking result by color (centroid of the tracking frame) is more distant than this, it is possible to perform stable tracking by performing updating at the position of the circle detection. Note that not only a multiple factor of the circle but any distance such as Euclidean distance may also be used. This is because in this case, even when the evaluation value of the tracking using the color feature and the evaluation value of the circle detection are both high, it is highly possible that the tracking using the color feature is not tracking the right object but is mistracking.

The position correction circuit 142 replaces the coordinates of the target area and size in the tracking result with the coordinates and size of the update area detection result, and stores the updated coordinates and size into the memory 111. At this time, since the result of the update area detection includes the center and the radius of the circle, the radius is drawn from the center to determine left top coordinates of the rectangular frame so that the left top coordinates have values such that the rectangle frame has a height and a width each of which is double the radius.

In addition, as shown in FIG. 10(c), when the evaluation value of the update area detection result is below a threshold th2, the tracking termination determination circuit 141 stores into the memory 111, the evaluation value of the tracking result, and the determination result to terminate the tracking.

Subsequently, it becomes possible to perform re-tracking by performing face detection, and causing the initial feature amount extraction unit 136 to perform automatic restoration, or to notify of the user a termination of the tracking processing and prompt the user to re-determine the position of the object to be tracked.

As described above, since tracking is possible even when the object is looking back, it is possible to perform, even in such a state, automatic framing and automatic capturing through controls such as AE and AF or camera control by the camera control circuit 145, in addition to UI controls performed in the tracking result drawing circuit, such as displaying the tracking frame or grading the tracking result area.

Figure 11:
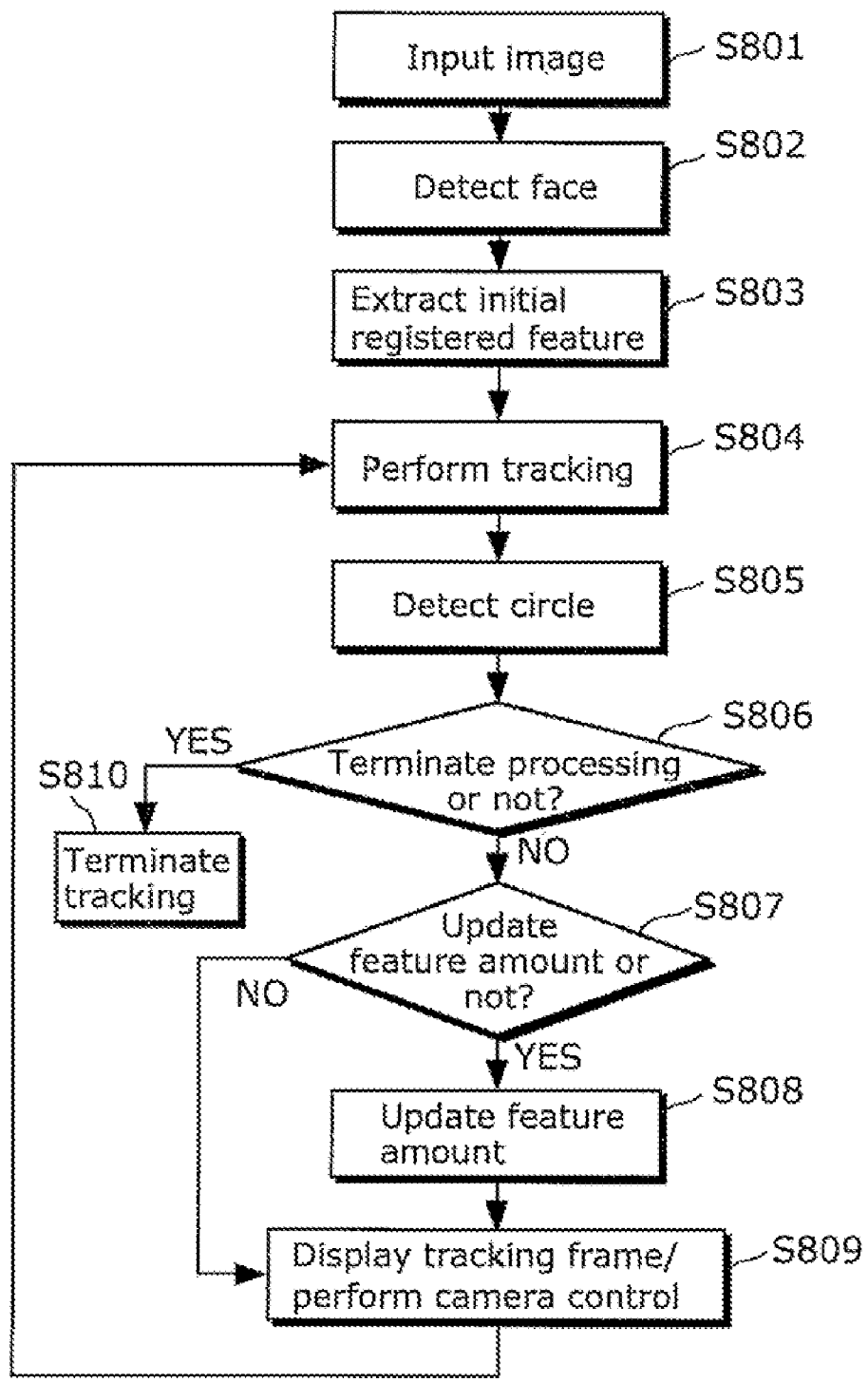
FIG. 11 is a flowchart of the second embodiment.
Figure 1:
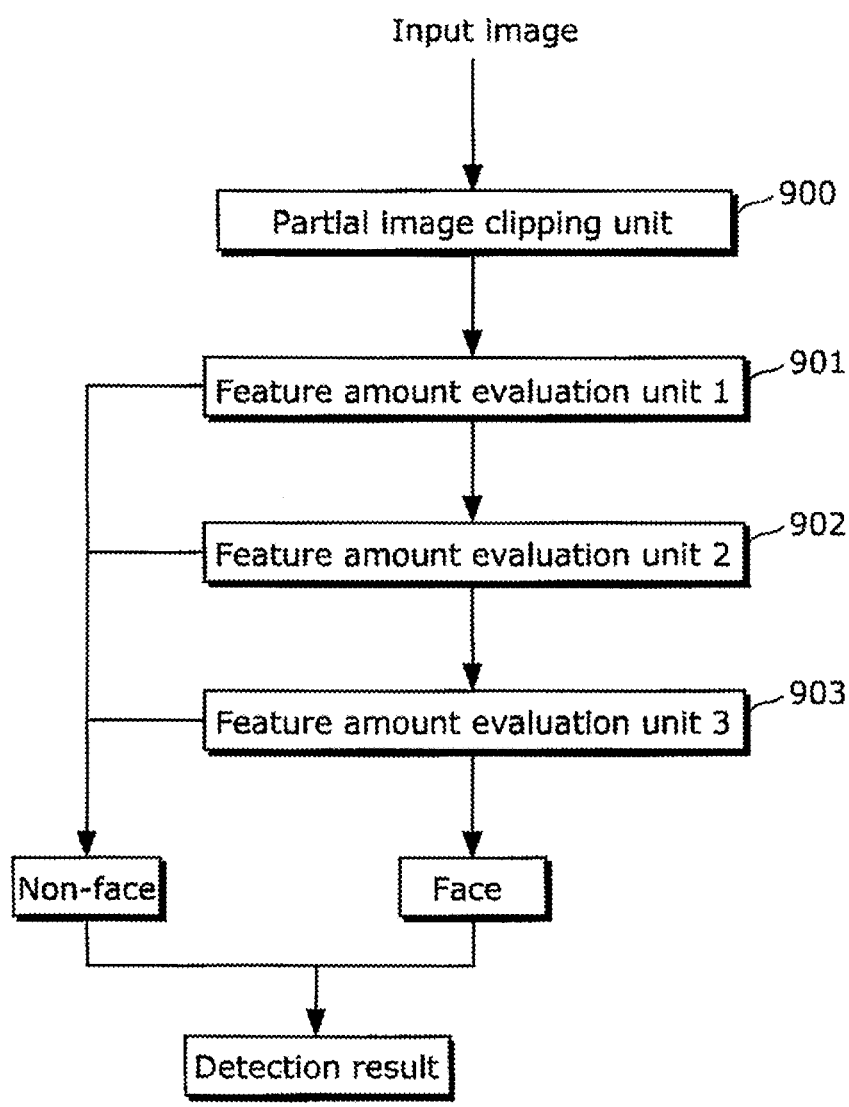
Figure 2:
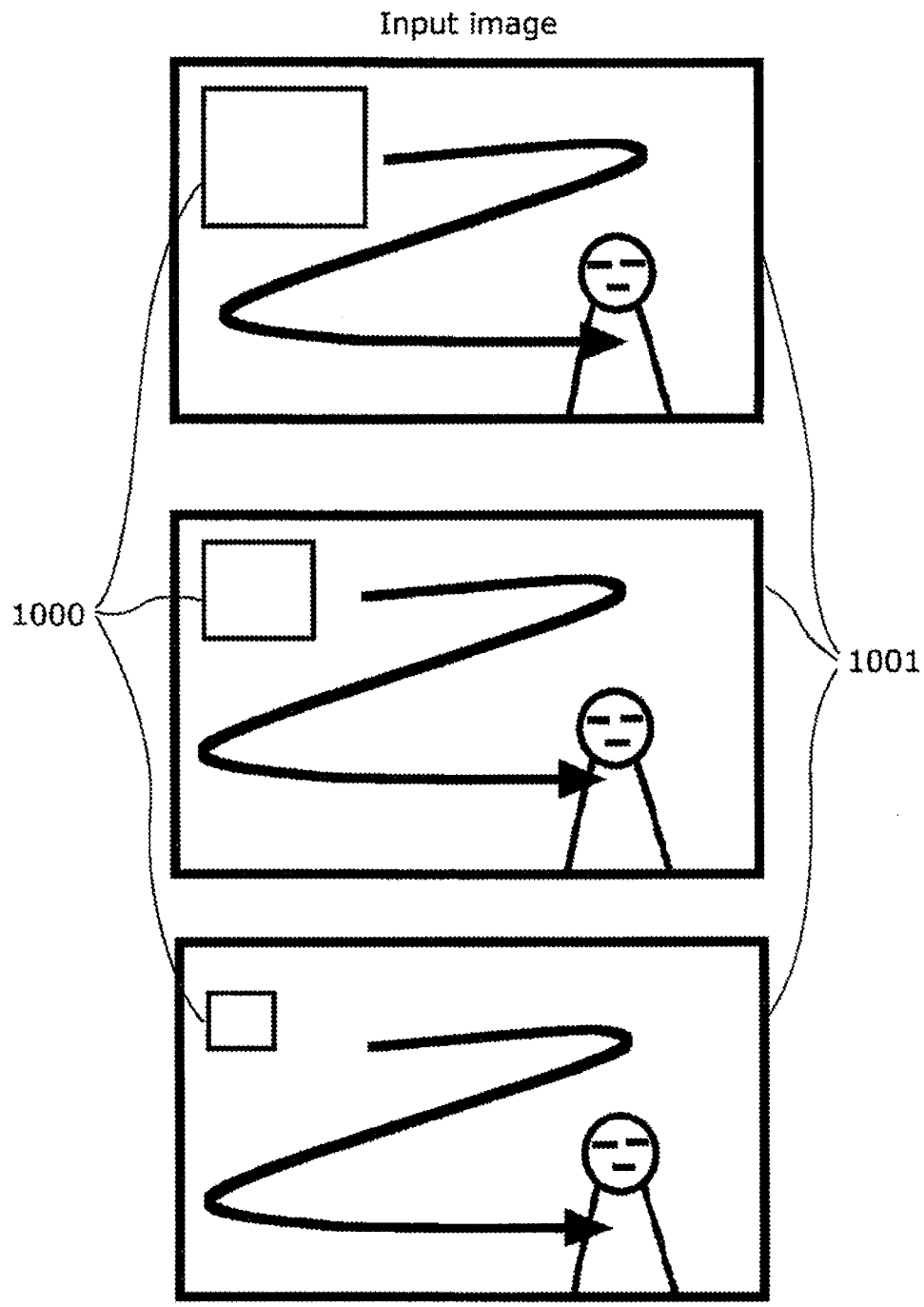

FIG. 11 shows steps when the above processing is executed by a program. Face detection (S802) is performed on the captured input data (S801). The initial registered feature is extracted for the result of the face detection (S803). In the next frame, tracking processing (S804) is performed using the color feature registered in Step S803, so that the target area is specified. Subsequently, circle detection is performed using a circle that is a shape feature, and the update area is determined (S805).

Based on the evaluation value of the tracking processing using the color feature and the evaluation value of the circle detection by drawing a circle that is a shape feature, it is determined whether or not to terminate the tracking processing (S806). In Step S806, it is determined to terminate the tracking when the evaluation value of the tracking processing using the color feature amount and the evaluation value by circle detection are both below the threshold th2. When it is determined to terminate the tracking, the tracking processing is terminated, and the termination of the processing is presented to the user by terminating the display of the tracking frame or by alarm or the like. Subsequently, the display may indicate a guidance message prompting the user to perform resetting of the initial position, or automatic restoration may be performed after setting the initial position through face detection (S810). When the processing is not terminated, as shown in FIG. 10(b), the threshold th1 is used, that is, it is determined to update the color feature irrespective of the evaluation result of the tracking processing using color feature when the evaluation value by circle detection is above the threshold th1; or as shown in FIG. 10(a), it is determined to update the feature amount of the color feature when the evaluation value of the result of the update area detection by circle detection is above the evaluation value of the tracking using the color feature (S807). When it is determined to update the feature amount, the position and feature amount of the tracking result are updated using the position and feature amount of the update area detection result (S808). Then, an LCD display of the position of the updated tracking result and camera control are performed (S809). Subsequently, the processing returns to the tracking process in Step S804, to be repeated from Steps S804 to 810.

The tracking processing method and the similarity calculating method are not limited to the color histogram matching method, but may be a method based on a least square distance or a method based on normalized correlation. In addition, the search method may be a method based on particle filters instead of simple scanning.

In addition, in the present embodiment, the color feature has been assumed as a tracking feature, and the shape feature has been assumed as the update area detection feature; however, in the case where the color is stable in response to color change but the shape is unstable, as seen in a nonrigid object having small color change, the color feature may be assumed as a feature of the update area detection result and the shape feature may be assumed as the tracking feature. Note that in the present embodiment, the face detection position has been used as the initial position, but the position of AF may be used as the initial position.

Note that respective function blocks in the block diagrams (such as FIG. 4) are typically realized as an LSI that is an integrated circuit. These function blocks may be separately configured as a single chip, or part or all of the function blocks may be configured as a single chip. For example, function blocks except the memory may be configured as a single chip.

The LSI, although referred to as such here, is also referred to as: IC, system LSI, super LSI, and ultra LSI, depending on integration degree.

In addition, the method of circuit Integration is not limited to the LSI but may be realized using a dedicated circuit or a general-purpose processor. After manufacturing the LSI, a field programmable gate array (FPGA) that allows programming or a reconfigurable processor in which connections of circuit cells and settings within the LSI are reconfigurable may be used.

Furthermore, when another integrated circuit technology appears to replace the LSI as a result of development of the semiconductor technology or some derivative technique, these function blocks may naturally be integrated using the technology. Application of biotechnology or the like is conceivable as a possibility.

In addition, among these functions, only units for storing the data to be coded or decoded may have a separate configuration instead of being included in the single chip.

INDUSTRIAL APPLICABILITY

An electronic camera and an image processing method according to the present invention have a tracking function to track an object changing appearance, and are useful for Best Shot function, camera control such as AE and AF, and framing of an image which can be realized by the tracking function. In addition, the electronic camera and the image processing method are useful for a monitoring camera which tracks an object such as a person.

The invention claimed is:

1. An electronic camera having a function to determine and display an object area in respective frames of images sequentially captured, the object area including an image of an object to be tracked, said electronic camera comprising:
   a tracking processing unit configured to search a predetermined range in a frame included in the respective frames, using a first feature amount previously registered and quantitatively indicating a feature of the object, to calculate a first evaluation value indicating a degree of matching between an image in an area obtained as a result of the search and the image of the object, and to determine a target area estimated to include the image of the object, based on the first evaluation value calculated;
   an update area calculation unit configured to search the predetermined range in the frame, using a second feature amount that is different from the first feature amount and quantitatively indicates a feature of the object, to calculate a second evaluation value indicating a degree of matching between an image in an area obtained as a result of the search and the image of the object, and to determine, within the frame, an update area for updating the first feature amount, based on the second evaluation value calculated;
   an update determination unit configured to determine whether or not to update the first feature amount by checking whether or not at least one of the first evaluation value and the second evaluation value satisfies a predetermined condition, the first evaluation value being calculated by said tracking processing unit, and the second evaluation value being calculated by said update area calculation unit;
   a registered feature amount updating unit configured to update the first feature amount with another first feature amount extracted from the update area, when said update determination unit determines to update the first feature amount; and
   a tracking result drawing unit configured to determine, as the object area, the target area determined by said tracking processing unit and draw information on the target area when said update determination unit determines not to update the first feature amount, and to determine, as the object area, the update area determined by said update area calculation unit and draw information on the update area when said update determination unit determines to update the first feature amount,
   wherein when the first feature amount that is previously registered is updated, said tracking processing unit is configured to determine another target area within another frame, using the updated first feature amount.

2. The electronic camera according to claim 1,
   wherein said tracking processing unit is configured to determine the target area estimated to include the image of the object, using color information of the object as the first feature amount, and
   said update area calculation unit is configured to determine the update area, using shape information of the object as the second feature amount.

3. The electronic camera according to claim 1,
   wherein said update determination unit is configured to determine to update the first feature amount in one of cases where the second evaluation value calculated by said update area calculation unit is above the first evaluation value calculated by said tracking processing unit and where the second evaluation value calculated by said update area calculation unit is above a first threshold that is previously determined.

4. The electronic camera according to claim 3,
   wherein said update determination unit is configured to set the first threshold to a larger value as an average saturation per pixel included in the image of the object increases, and to set the first threshold to a lower value as the average saturation of the object decreases.

5. The electronic camera according to claim 1,
   wherein said update determination unit is further configured to determine to update the first feature amount when a distance between the target area determined by said tracking processing unit and the update area determined by said update area calculation unit is equal to or above a second threshold that is previously determined.

6. The electronic camera according to claim 1, further comprising
   a termination determination unit configured to determine whether or not it is possible to continue tracking the object,
   wherein said termination determination unit is configured to determine that it is not possible to continue tracking the object when both the first and second evaluation values are below a third threshold that is previously determined.

7. The electronic camera according to claim 6,
   wherein said tracking result drawing unit is configured to terminate the drawing of the target area and the update area when said termination determination unit determines that it is not possible to continue tracking the object.

8. The electronic camera according to claim 6,
   wherein said tracking result drawing unit is configured to draw an image which shows the user that the tracking is not possible, when said termination determination unit determines that it is not possible to continue tracking the object.

9. The electronic camera according to claim 6,
   wherein said tracking result drawing unit is configured to draw an image which prompts the user to perform resetting of an initial position, when said termination determination unit determines that it is not possible to continue tracking the object.

10. The electronic camera according to claim 6,
    said tracking result drawing unit is configured to perform setting of an initial position by performing face detection from a start when said termination determination unit determines that it is not possible to continue tracking the object.

11. The electronic camera according to claim 1, further comprising:
    a face detection circuit which detects a face in the image in the respective frames; and
    a facing direction recognition circuit which recognizes a facing direction of the face detected by said face detection circuit,
    wherein said update area calculation unit is configured to calculate an update reference area that is an area of the face looking sideways when said facing direction recognition circuit recognizes that the face that is the object is a profile, and to subsequently calculate the update area in the update reference area, based on a predetermined positional relationship between a face portion and a hair portion.

12. The electronic camera according to claim 1, further comprising
a camera control unit configured to change a camera parameter to adjust an operation of said electronic camera, based on one of the target area determined by said tracking processing unit and the update area determined by said update area calculation unit.

13. The electronic camera according to claim 12,
wherein said camera control unit is configured to control, based on the camera parameter, an operation of at least one of a body and a head of said electronic camera, so as to perform control to adjust all or part, which is determined, of the object to a predetermined size and a predetermined position within the frame.

14. The electronic camera according to claim 1, further comprising
a target area initial setting unit configured to determine an initial position of the target area, based on an input given by the user or using a predetermined method.

15. The electronic camera according to claim 14,
wherein said target area initial setting unit is configured to determine, as the initial position, a detection position of at least one of a person and a face.

16. The electronic camera according to claim 14,
wherein said target area initial setting unit is configured to determine, as the initial position, an area on which said electronic camera is focused through an auto focus (AF) function.

17. An image processing method executed by an electronic camera having a function to determine and display an object area included in respective frames of images sequentially captured, the object area including an image of an object to be tracked, said image processing method comprising:
searching for the object in a predetermined range in the respective frames, using a first feature amount previously registered and quantitatively indicating a feature of the object, calculating a first evaluation value indicating a degree of matching between an image in an area obtained as a result of the search and the image of the object, and determining a target area estimated to include the image of the object, based on the first evaluation value calculated, said searching, said calculating, and said determining being performed by a tracking processing unit;
searching for the object in the predetermined range in the frame, using a second feature amount that is different from the first feature amount and quantitatively indicating the feature of the object, calculating a second evaluation value indicating a degree of matching between an image in an area obtained as a result of the search and the image of the object, and determining, within the frame, an update area for updating the first feature amount, based on the second evaluation value calculated, said searching, said calculating, and said determining being performed by the an update area calculation unit;
determining, by an update determining unit, whether or not to update the first feature amount by checking whether or not at least one of the first evaluation value and the second evaluation value satisfies a predetermined condition, the first evaluation value being calculated by the tracking processing unit, and the second evaluation value being calculated by the update area calculation unit;
updating, by a registered feature amount updating unit, the first feature amount with another first feature amount extracted within the update area, when the update determination unit determines to update the first feature amount; and
determining, as the object area, the target area determined by the tracking processing unit and drawing, by a tracking result drawing unit, information on the target area when the update determination unit determines not to update the first feature amount, and determining, as the object area, the update area determined by the update area calculation unit and drawing, by the tracking result drawing unit, information on the update area when the update determination unit determines to update the first feature amount,
wherein the tracking processing unit is configured to determine a new target area within a new frame, using the updated first feature amount, when the first feature amount that is previously registered is updated.

18. An integrated circuit having a function to determine and display an object area in respective frames of images sequentially captured, the object area including an image of an object to be tracked, said integrated circuit comprising:
a tracking processing unit configured to search a predetermined range in a frame included in the respective frames, using a first feature amount previously registered and quantitatively indicating a feature of the object, to calculate a first evaluation value indicating a degree of matching between an image in an area obtained as a result of the search and the image of the object, and to determine a target area estimated to include the image of the object, based on the first evaluation value calculated;
an update area calculation unit configured to search the predetermined range in the frame, using a second feature amount that is different from the first feature amount and quantitatively indicates a feature of the object, to calculate a second evaluation value indicating a degree of matching between an image in an area obtained as a result of the search and the image of the object, and to determine, within the frame, an update area for updating the first feature amount, based on the second evaluation value calculated;
an update determination unit configured to determine whether or not to update the first feature amount by checking whether or not at least one of the first evaluation value and the second evaluation value satisfies a predetermined condition, the first evaluation value being calculated by said tracking processing unit, and the second evaluation value being calculated by said update area calculation unit;
a registered feature amount updating unit configured to update the first feature amount with another first feature amount extracted from the update area, when said update determination unit determines to update the first feature amount; and
a tracking result drawing unit configured to determine, as the object area, the target area determined by said tracking processing unit and draw information on the target area when said update determination unit determines not to update the first feature amount, and to determine, as the object area, the update area determined by said update area calculation unit and draw information on the update area when said update determination unit determines to update the first feature amount,
wherein when the first feature amount that is previously registered is updated, said tracking processing unit is configured to determine another target area within another frame, using the updated first feature amount.

19. A non-transitory computer-readable recording medium on which an image processing program having a function to cause a computer to determine and display an object area in respective frames of images sequentially captured is recorded, the object area including an image of an object to be tracked, wherein a tracking processing unit searches a predetermined range in a frame, using a first feature amount previously registered and quantitatively indicating a feature of the object, calculates a first evaluation value indicating a degree of matching between an image in an area obtained as a result of the search and the image of the object, and determines a target area estimated to include the image of the object, based on the first evaluation value calculated;

an update area calculation unit searches the predetermined range in the frame, using a second feature amount that is different from the first feature amount and quantitatively indicates a feature of the object, calculates a second evaluation value indicating a degree of matching between an image in an area obtained as a result of the search and the image of the object, and determines, within the frame, an update area for updating the first feature amount, based on the second evaluation value calculated;

an update determination unit determines whether or not to update the first feature amount by checking whether or not at least one of the first evaluation value and the second evaluation value satisfies a predetermined condition, the first evaluation value being calculated by the tracking processing unit, and the second evaluation value being calculated by the update area calculation unit;

a registered feature amount updating unit updates the first feature amount with another first feature amount extracted from the update area, when the update determination unit determines to update the first feature amount; and a tracking result drawing unit determines, as the object area, the target area determined by the tracking processing unit and draws information on the target area when the update determination unit determines not to update the first feature amount, and determines, as the object area, the update area determined by the update area calculation unit and draws information on the update area when the update determination unit determines to update the first feature amount, wherein when the first feature amount that is previously registered is updated, the tracking processing unit determines another target area within another frame, using the updated first feature amount.

* * * * *

UNITED STATES PATENT AND TRADEMARK OFFICE
CERTIFICATE OF CORRECTION

PATENT NO. : 8,253,819 B2  
APPLICATION NO. : 12/865917  
DATED : August 28, 2012  
INVENTOR(S) : Yasunori Ishii It is certified that error appears in the above-identified patent and that said Letters Patent is hereby corrected as shown below:

Replace drawings Figures 1-3 and 5 with the attached replacement sheets.

Signed and Sealed this  
Fifth Day of February, 2013

Teresa Stanek Rea  
*Acting Director of the United States Patent and Trademark Office*

FIG. 3 (PRIOR ART)
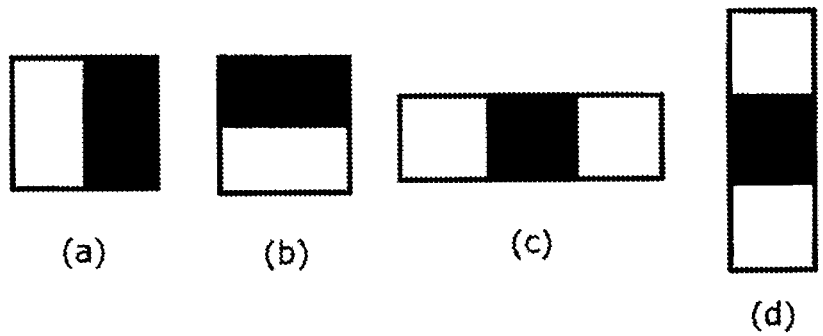
(a)  (b)  (c)
(d)
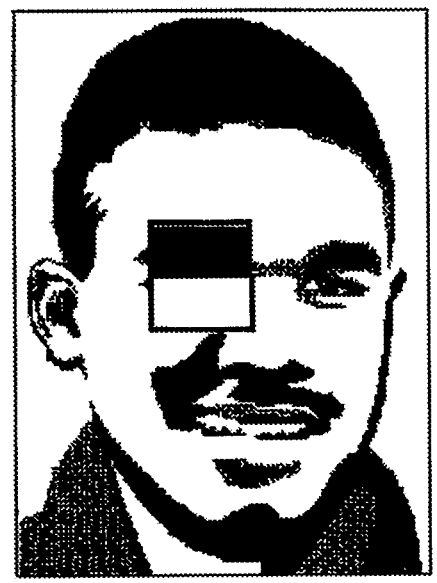
(e)

FIG. 5 (PRIOR ART)
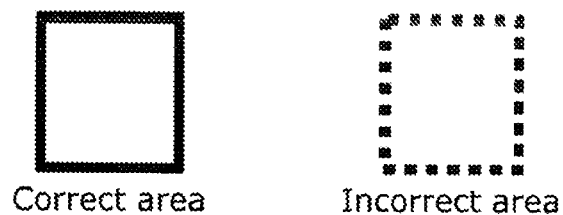
Correct area  Incorrect area
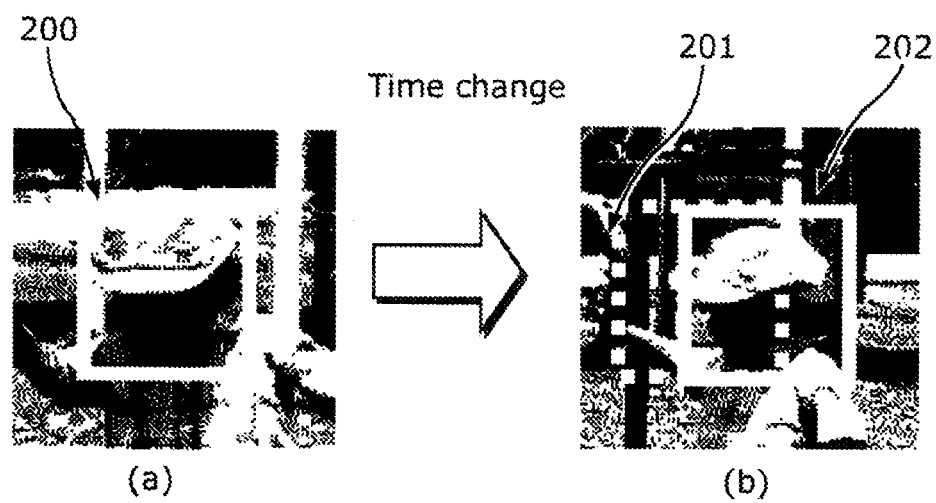
(a) Time change (b)
Feature similar, but incorrect
Feature not similar, but correct